(No Model.) 2 Sheets—Sheet 1.
C. L. HUSTON.
TRUCK.
No. 490,598. Patented Jan. 24, 1893.
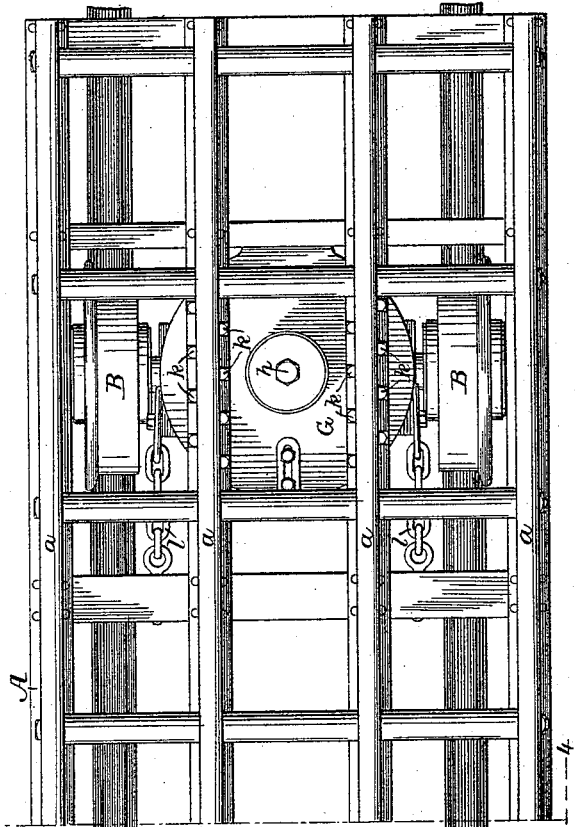
FIG. 1.
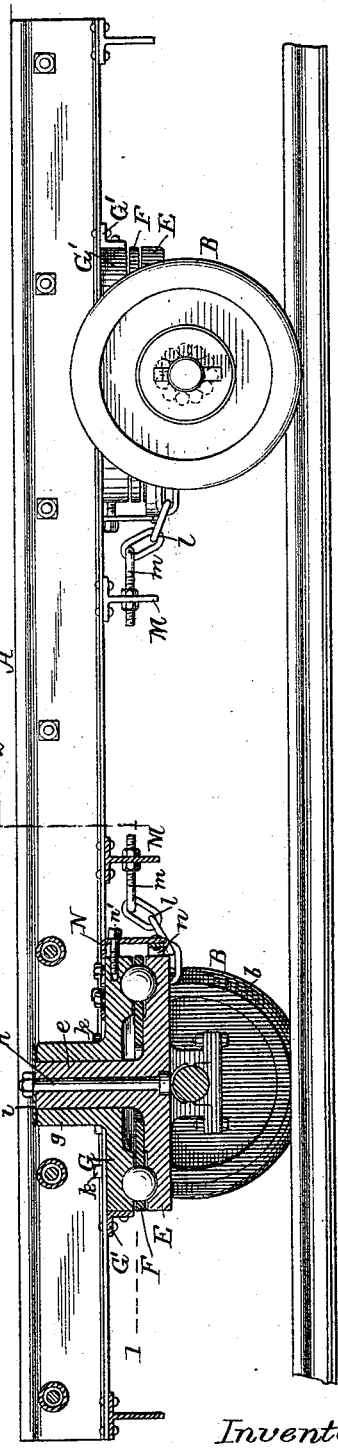
FIG. 2.
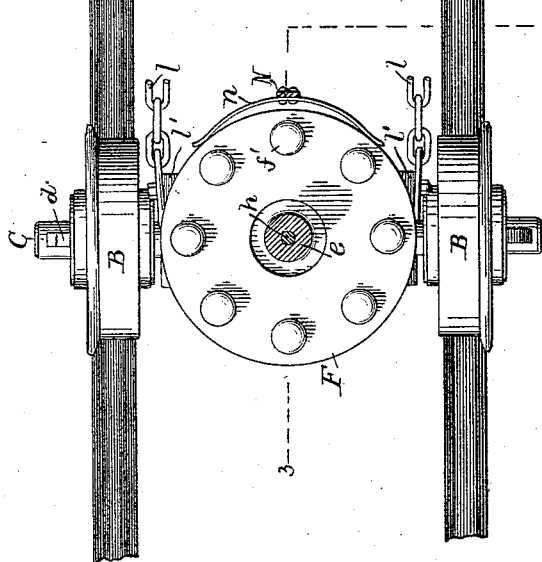
Witnesses:
F. D. Goodwin
R. Schleicher
Inventor:
Charles L. Huston
By his Attorneys
Howson & Howson (No Model.) 2 Sheets—Sheet 2.
C. L. HUSTON.
TRUCK.
No. 490,598. Patented Jan. 24, 1893.
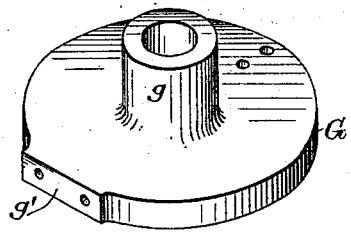
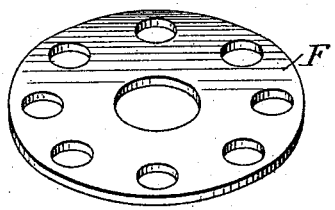
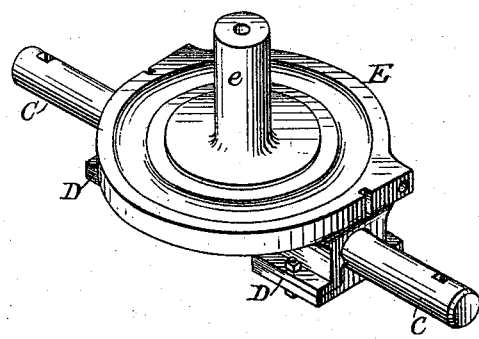
FIG. 4.
FIG. 3.
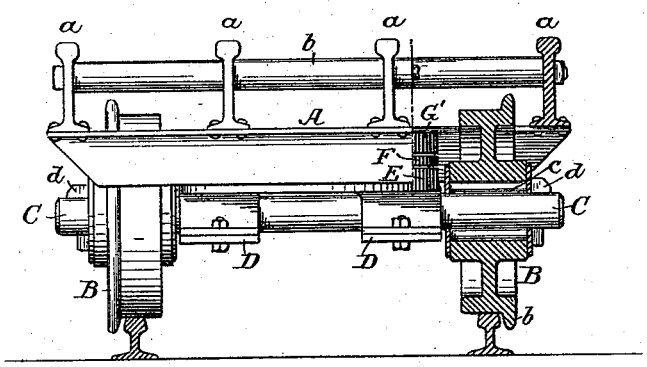
Witnesses:
P. D. Goodwin
R. Schleicher
Inventor:
Charles L. Huston
By his Attorneys
Howson & Howson
THE NORRIS PETERS CO., PHOTO-LITHO., WASHINGTON, D. C.

UNITED STATES PATENT OFFICE.

CHARLES L. HUSTON, OF COATESVILLE, PENNSYLVANIA.

TRUCK.

SPECIFICATION forming part of Letters Patent No. 490,598, dated January 24, 1893.

Application filed July 18, 1892. Serial No. 440,384. (No model.)

*To all whom it may concern:*

Be it known that I, CHARLES L. HUSTON, a citizen of the United States, and a resident of Coatesville, Chester county, Pennsylvania, have invented certain Improvements in Trucks, of which the following is a specification.

My invention relates to certain improvements in the construction of cars or trucks and is especially applicable to that class of trolleys or trucks used in stores and factories for conveying articles from place to place where the tracks on which the car or truck is run have curves of small radius, as more fully described hereinafter.

In the accompanying drawings:—Figure 1, is a plan view, partly in section on the line 1—2 Fig. 2, of a truck constructed in accordance with my invention; Fig. 2, is an elevation of the same partly in section on the line 3—4, Fig. 1; Fig. 3, is an end elevation, partly in section; and Fig. 4, is a view illustrating a number of the parts of the truck detached from each other.

Referring to the drawings A represents a platform, made in any suitable manner, the platform shown in the drawings being constructed of a series of longitudinal beams $a$ united by cross bars and filling pieces $b$, so as to form a strong platform, which may be advantageously employed for the moving of heavy articles and being especially adapted for use in foundries or rolling mills. for the transportation of heated ingots, &c.

B are the supporting wheels of the truck, which are adapted to suitable rails, the flanges $b$ of the wheels being on the outside of the rails for a purpose described hereinafter, and these wheels are mounted upon transverse axles C held in boxes D which form part of, or are secured to a disk E, or the wheels may be arranged one to turn with the axle and the other to revolve upon the axle. Between the axles C and the hub of the supporting wheels, I preferably place antifriction rollers $c$ in order to reduce the bearing surface and for the sake of economy the wheels are held in place by linch pins $d$ although, of course, any desired construction may be employed, such for instance as the ordinary axle boxes of railway car trucks. The disks E are provided with journals $e$ adapted to bearings in the hubs $g$ of second disks G, the hub and journal of each being lengthened out in order to provide an elongated bearing for the journal and the two parts being held together by a pin $h$ and a disk $i$ which extends over the top of the spindle $e$ and the hub $g$. The disk G is provided with a flat face $g'$ by which it may be secured to a transverse bar G' extending under the platform and the bars $a$ forming the platform which likewise are secured to this disk by a series of bolts $k$, so as to hold said disk firmly in place. The adjoining faces of the disks E and G are provided with semi-circular grooves $f$ in which run antifriction balls $f'$ adapted to orifices in a spacing disk F which turns freely in the space between the disks E and G and permits the lower axle carrying disk E to turn freely to permit the wheels to accommodate themselves to the curves in the track, although the antifriction balls may be omitted, if desired, where the truck is used for the transportation of light or cool materials, the balls being employed to advantage where the truck is used to move hot ingots or billets in mills. As the flanges $b$ of the supporting wheels are on the outside of the rails of the track, the flange which first bears against the side of the inner rail in traveling around a curve will throw the opposite wheel upon the same axle around for some distance, the axle turning on the journal $e$ as a center and while traversing the curve keeping in a radial line from the center of such curve. Any excess of movement is prevented by chains $l$ extending from a projecting block $l'$ on the lower disk to a bolt $m$ which is adjustably secured in a transverse bar M secured to the platform A and in order to prevent too free movement of the lower disk and the consequent oscillation of the axle, I secure to the platform or to the upper disk G a bar N which carries at its lower end a friction shoe or spring $n$ adapted to bear upon the side or periphery of the disk E and the amount of friction between the two being adjusted by means of a nut $n'$ extending through the bar N and turning in the upper disk G. By this means the shoe or spring may be moved toward or from the disk E and any desired amount of friction be employed to resist the turning of the spindle e and the oscillation of the axle, while traveling on the track, be avoided.

Having thus described my invention, I claim and desire to secure by Letters Patent:—

1. The combination of the platform, a disk secured thereto and having a bearing g, a lower disk, a journal thereon adapted to said bearing g, an axle carried by said lower disk and supporting wheels mounted on said axle, substantially as specified.

2. The combination of the disk G, the platform to which said disk is secured, a bearing g secured to or forming part of said disk, a lower disk E, a journal carried thereby and adapted to the bearing g, an axle carried by said lower disk, and supporting wheels mounted upon said axle, substantially as specified.

3. The combination of the platform, a bearing disk secured thereto, a lower movable disk E, an axle carried thereby, and flanged supporting wheels mounted upon said axle, said supporting wheels having their flanges upon the outside of the rails, substantially as specified.

4. The combination of the platform, the disk G secured thereto, the lower disk E, an axle carried thereby, supporting wheels on said axle, and a friction shoe adapted to bear upon the periphery of said lower disk, substantially as specified.

5. The combination of the platform, the disk G secured thereto, the lower disk E, the axles secured to said disk, supporting wheels mounted upon said axle, a friction shoe adapted to bear upon the periphery of said disk E, and devices for adjusting said friction shoe from and toward the disk, substantially as specified.

6. The combination of the wheels, the axles carrying the same, the movable disks E, the fixed disks G, and a supporting platform to which said fixed disks G are secured, said platform comprising longitudinal bars a, spacing blocks between said bars, and securing bolts for holding the parts in position, substantially as specified.

In testimony whereof I have signed my name to this specification in the presence of two subscribing witnesses.

CHAS. L. HUSTON.

Witnesses:
JNO. E. PARKER,
H. F. REARDON.